United States Patent [19]

Grimm et al.

[11] Patent Number: 5,560,433
[45] Date of Patent: Oct. 1, 1996

[54] DUAL ACTION EARTH WORKING IMPLEMENT

[75] Inventors: William L. Grimm, Wheaton; Austin W. Lutz, Jr., Woodridge, both of Ill.

[73] Assignee: Case Corporation, Racine, Wis.

[21] Appl. No.: 241,646

[22] Filed: May 12, 1994

[51] Int. Cl.$^6$ ..................................... A01B 61/04
[52] U.S. Cl. ........................... 172/266; 172/264
[58] Field of Search ........................ 172/264–68

[56] References Cited

U.S. PATENT DOCUMENTS

| | | | |
|---|---|---|---|
| 3,321,027 | 5/1967 | Johnson et al. | 172/266 |
| 3,972,374 | 8/1976 | Venable et al. | 172/261 |
| 3,976,144 | 8/1976 | Ralston et al. | 172/267 |
| 4,036,305 | 7/1977 | Kinzenbaw | 172/283 |
| 4,128,130 | 12/1978 | Green et al. | 172/266 |
| 4,161,986 | 7/1979 | Ward | 172/266 |
| 4,703,810 | 11/1987 | Meiners | 172/178 |
| 4,865,132 | 9/1989 | Moore, Jr. | 172/266 |

FOREIGN PATENT DOCUMENTS 1054426  5/1979  Canada .................... 172/265

OTHER PUBLICATIONS

Booklet entitled "7500 Vari–Width Moldboard Plow, Semi-Mounted In-The-Furrow Type" Rac 9-19092, Copyright © 1992 Case Corporation (50 pages).

*Primary Examiner*—Spencer K. Warnick, IV
*Attorney, Agent, or Firm*—Rudnick & Wolfe

[57] ABSTRACT

An earth working implement including a frame having at least one earth working tool mounted thereon. A spring biased linkage assembly connects the tool to the frame to allow for vertical "floating" and "tripping" movements of the tool. The linkage assembly includes upper and lower generally parallel links which are pivotally connected to the frame and to a generally vertical standard having the tool connected to the lower end thereof. The upper link is formed from a pair of toggle elements defining a pivotal connection between opposite ends thereof. A spring assembly normally maintains the toggle elements in non-collapsible relation relative to each other and inhibits floating movements of the tool as it is drawn through the soil. The spring mechanism furthermore allows the toggle elements to move to a collapsed position relative to each other thereby allowing the tool to move to a tripped position. The upper and lower links of the linkage assembly are connected by a series of pivotal connections arranged in a quadrilateral formation relative to each other and such that a 1600 pound preload spring tension setting on the spring assembly advantageously requires a 4600 pound draft condition to abe applied to the tool before the tool begins to float and a draft condition ranging between 4200 and 6800 pounds is required to be imparted to the tool before the spring mechanism allows the tool to be moved to a tripped position. The implement of the present invention further includes a mechanism for adjusting the level of draft force required to be imparted to the tool before the tool is moved to a tripped position.

3 Claims, 7 Drawing Sheets

DUAL ACTION EARTH WORKING IMPLEMENT

FIELD OF THE INVENTION

The present invention generally relates to earth working implements and, more particularly, to earth working implements having ground penetrating tools or units which elevationally move in response to relatively high draft conditions being applied against the tool or unit as it is drawn through the ground.

BACKGROUND OF THE INVENTION

A plurality of earth working implements, such as a gang of moldboard plow units or the like, are typically mounted on a common frame and pulled through the ground by a tractor or other suitable off-highway implement. Each plow unit is individually mounted to the frame and is designed to ensure that the plow unit maintains a desired depth in the soil as it is pulled therethrough. That is, the plow unit is designed such that, during field operations, the plow unit is prevented from "riding out" of the soil or cutting too deeply into the soil.

The resistance that is encountered by the plow units as they are pulled through the soil or ground varies considerably depending upon a number of factors. As an example, the porosity of the soil affects the resistance imparted to the tools as they are pulled through the ground. Plowing fields after a harvest was commonplace practice in years past. In view of the continued emphasis on soil conservation, however, there is a tendency to condition or plow the field less frequently than heretoforeknown. Accordingly, the soil becomes more and more compacted as off-highway equipment such as tractors and the like are driven thereover. The ability of the tool or plow unit to float or elevate in response to high resistance forces being applied thereto inhibits damage to the tool. When the field is eventually plowed, the compactness of the soil offers relatively high resistance to the tool being pulled therethrough. The presence of subterranean rocks and roots further complicates the plowing process.

U.S. Pat. No. 3,321,027 to O. E. Johnson et al discloses a unique plow mounting arrangement. The Johnson et al apparatus mounts a ground engaging tool or plow unit such that it is capable of both floating and tripping movements. That is, the Johnson et al apparatus mounts each plow unit in a manner allowing elevational movement or float of the plow unit against the action of a spring assembly when relatively high resistance or draft conditions are imparted to the implement as it is drawn through the field. The Johnson et al apparatus furthermore allows the plow units to move rearwardly and upwardly out of the ground engagement to a tripped position when abnormally high resistance or draft force is encountered by the plow unit as it is pulled through the ground. As will be appreciated, the ability of the plow unit to be tripped out of its normal operating position avoids damage to the plow unit upon engagement with a rock, root or the like. With the Johnson et al. apparatus, the plow unit is automatically returned to its operating position after the obstacle has been passed.

Today's tractors are larger than earlier versions and, thus, are capable of developing increased levels of power. The increase in power capability translates into the ability to condition the field faster than previously known. Of course, there is a direct correlation between the speed of the tractor and the resistance or draft force being applied to the plow unit being drawn thereby when the unit is in its operating position in the ground. The faster the ground speed of the tractor, the higher the draft condition being imparted to the tool.

The high resistance or draft force applied against the plow unit tends to cause the tool to elevate or float away from the depth normally obtainable with the plow unit. Increasing the spring pressure to force the plow unit downwardly does little to prevent the tool from floating. On the other hand, increasing the spring pressure likewise increases the trip load for the plow unit. As will be appreciated, increasing; the trip load endangers the plow unit in that it will not be as responsive to obstacles that would normally cause the plow unit to move to a tripped position.

Thus, there is a need and a desire for a dual action earth working implement having an earth working tool that is suspended by a linkage assembly designed to significantly increase the draft force that may be applied to the tool before the tool begins to float without significantly increasing the level of draft force that needs to be applied to the tool before the tool moves to a tripped position and without significantly increasing the spring force acting against the linkage to hold the tool in a proper working relationship during a plowing operation.

SUMMARY OF THE INVENTION

In view of the above, and in accordance with the present invention, there is provided a an implement comprising a frame having one or more earth working tools such as plow units mounted thereon. Each earth working tool is configured to seek a predetermined operational ground engaging position as it is pulled through the ground. A spring biased linkage assembly individually suspends and individually connects the tool to the frame to allow for vertical floating movement of the plow unit in a generally upward direction from its operational position in response to high draft forces being imparted to the tool and tripping movement of the tool when abnormally high draft forces are imparted to the tool. The linkage assembly is configured to increase the level of draft forces that are required to be imparted to the tool to cause the tool to float without significantly increasing the trip load or the spring pressure acting on the linkage assembly.

The linkage assembly of the present invention comprises a support which is connected to the frame and a generally vertical standard having the tool connected to one end thereof. The standard is connected to the support by lower and upper generally parallel links. The lower link has a fixed length and is connected to the support at a first pivot connection and is connected to the standard at a second pivot connection. The upper link is connected to the support at a third pivot connection arranged vertically above the first and second pivot connections and rearward of the first pivot connection. The upper link is connected to the standard at a fourth pivot connection arranged vertically between the first and third pivot connection and forwardly of the second pivot connection connecting the lower link to the standard. The first, second, third and fourth pivot connections are arranged in quadrilateral formation relative to each other. The upper link comprises two toggle elements which are connected proximate midlength of the upper link at a fifth pivot connection. The fifth pivot connection is arranged above an on-center relation with respect to the third and fourth pivot connections.

A spring mechanism normally holds the toggle elements of the upper link in a noncollapsible relation relative to each other in the operating position of the tool and inhibits floating movements of the tool as it is drawn through the soil. The spring mechanism permits the toggle elements of the upper link to move to a collapsed position relative to each other thereby allowing the tool to move to a tripped position. The spring mechanism includes springs which are connected to the upper link proximate to the fifth pivot connection and have a preloaded setting of 1600 pounds thereon.

In operation, each ground engaging tool of the implement cuts into the soil as the implement is drawn forward. The design of the plow unit is such that it reaches a predetermined operational depth beneath the surface of the ground and the configuration of the tool allows it to remain at that depth as the plow unit is pulled through the ground. A salient feature of the present invention concerns geometrically positioning the pivot connections of the linkage assembly relative to each other such that the 1600 pound preload spring tension setting of the spring mechanism requires a 4600 pound draft condition to be imparted to the tool before the tool begins to float. Moreover, the geometric positioning of the pivot connections of the linkage assembly advantageously requires that a draft condition ranging between about 4200 pounds and about 6800 pounds is required to be imparted to the tool before the spring mechanism allows the toggle elements of the upper link to collapse thereby allowing the tool to move out of the ground to a tripped position. As will be appreciated, the spring mechanism furthermore serves to automatically return each tool to an operative ground engaging position after the obstruction or whatever caused the tripping movement of the tool is cleared.

In a preferred form of the invention, the spring mechanism includes a housing Comprised of a pair of generally parallel canisters for receiving the springs therein. An open lower end of each canister is pivotally secured to the upper link for pivotal movement about a generally fixed axis. The upper ends of the canisters ;are preferably connected to each other.

The present invention also includes an adjustment mechanism for adjusting the level of draft force required to be applied to the fifth pivot connection before the toggle elements of the upper link move to a collapsed position relative to each other. The adjustment mechanism includes an adjustable member that is releasably secured to one of the toggle elements of the upper link and is arranged to fit beneath an overlying section of the other toggle member. The adjustable member has at least three different settings. In one setting of the adjustable member, the fifth pivot connection is arranged a first predetermined distance from an on-center relation with the pivot axes of the third and fourth pivot connections of the linkage assembly. In a second setting of the adjustable member, the fifth pivot connection on the upper link is arranged a second predetermined distance from an on-center relation relative to the pivot axes of the third and fourth pivot connection of the linkage assembly. Upon removal of the adjustable member, the fifth pivot connection on the upper link is disposed a third predetermined distance from an on-center relation relative to the pivot axes of the third and fourth pivot connections of the linkage assembly. As will be appreciated, the ability to adjust the relative position of the fifth pivot connection to the on-center relation relative to the pivot axes of the third and fourth pivot connections is determinative of the level of draft force required to be applied to the tool in order to cause the toggle elements of the upper link to move against the action of the spring and collapse relative to each other.

An advantage of the present invention is that the level of draft forces required to float the tool from its normal working position in the soil has been significantly increased over the Johnson et al device without a corresponding significant change in the trip load or a significant change in the preloaded spring pressure required for the spring mechanism. Accordingly, the implement can be drawn through the field at a quicker rate than prior art implements with both vertical and trip relief to protect the tool as it is drawn through the soil. The ability to move through the field faster improves productivity since the invention allows the implement to be operated in a higher draft load environment. As speed increases on a linear basis, draft is increasing on an exponential basis attempting to force the tool to "float" or "ride out." As will be appreciated by those skilled in the an, the ability to inhibit the tool from "tiding out" of the soil during a field operation enhances the overall performance of the implement.

These and other objects, aims, and advantages of the present invention will become readily apparent from the following detailed description, the detailed drawings, and the appended claims.

DETAILED DESCRIPTION OF THE DRAWINGS

DETAILED DESCRIPTION OF A PREFERRED EMBODIMENT

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 1:
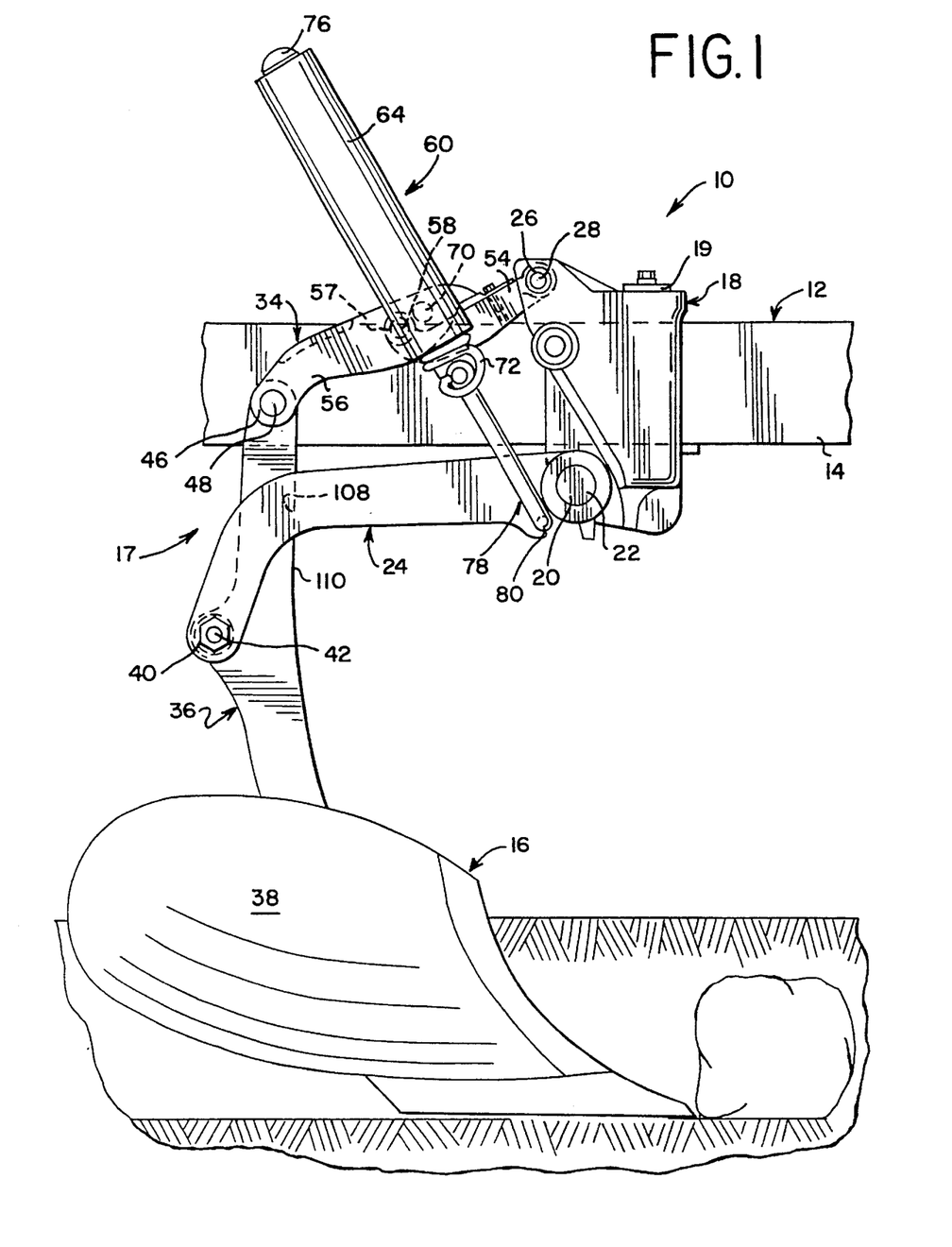
FIG. 1 is a side elevational view of the portion of an implement carrying a plow unit thereon through a linkage assembly embodying the present invention.
Figure 2:
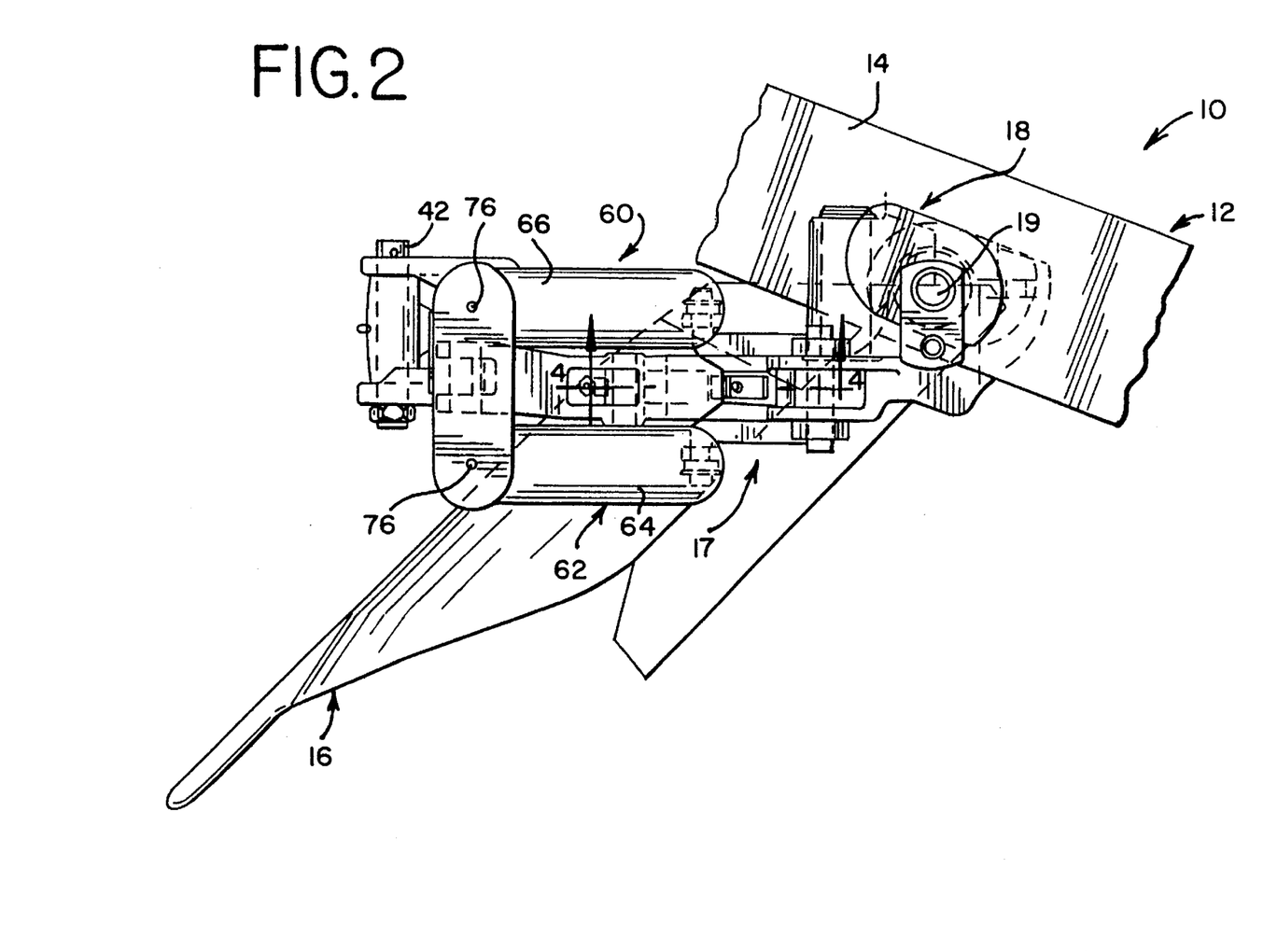
FIG. 2 is a plan view of the implement shown in FIG. 1.

Referring now to the drawings, wherein like reference numerals refer to like parts throughout several views, in FIGS. 1 and 2 there is shown a plowing implement generally designated by reference numeral 10. Implement 10 includes a mobile frame 12 having a diagonally elongated beam or bar 14 upon which may be mounted one or more earth working tools 16 such as plow units or the like.

Each tool 16 is suspended from and independently connected to the beam 14 by a linkage assembly 17. The linkage assembly 17 for connecting each tool 16 to the beam 14 preferably comprises a support 18. In the illustrated embodiment, the support 18 is connected to the beam 14 as by a conventional pivot pin 19 allowing the support 18 and the tool 16 connected thereto to pivot about a generally vertical axis thereby setting the spacing between adjacent tools 16. Suffice it to say, the support 18 defines a first or lower pivot 20 including a pivot pin 22 for mounting thereon a forward end of a lower link 24. The support 18 further defines a second or upper pivot 26 including a pivot pin 28 for mounting thereon a forward end of an upper link 34. Notably, the upper pivot 26 is arranged above and rearward of the lower pivot 20.

A generally vertical standard 36 connects the tool 16 to the links 24, 34 of the linkage 17. In the illustrated embodiment, the lower end of standard 36 is configured to mount a moldboard plow bottom 38 thereto. About mid-length thereof, and preferably on a rear side thereof, standard 36 is provided with a lower pivot 40 including a pin 42 for mounting thereon a rear and of the lower link 24. The standard 36 further defines a second or upper pivot 46 including a pin 48 for mounting thereon a rear end of the upper link 34.

In the position shown, the lower link 24 and upper link 34 extend generally parallel to each other. The lower link 24 has a fixed length between the pivot connections 22 and 42. In the embodiment shown in FIG. 3, the rear end of link 24 is configured with a pair of bifurcated parallel arms 50 and 52 arranged on opposite sides of standard 36. Arms 50 and 52 each define axially aligned apertures 53 for receiving and holding opposite ends of pivot pin 42.

In the illustrated embodiment, the upper link 34 is comprised of two toggle members or links 54 and 56 joined to each other at a pivot or fulcrum 57, defined by pivot pin 58. As shown in FIG. 1, a forward end of toggle member 54 is pivotally connected to the support 18 as by pin 28. A rear end of toggle member 56 is pivotally connected to the upper end of standard 36 as by pivot pin 48.

Figure 3:
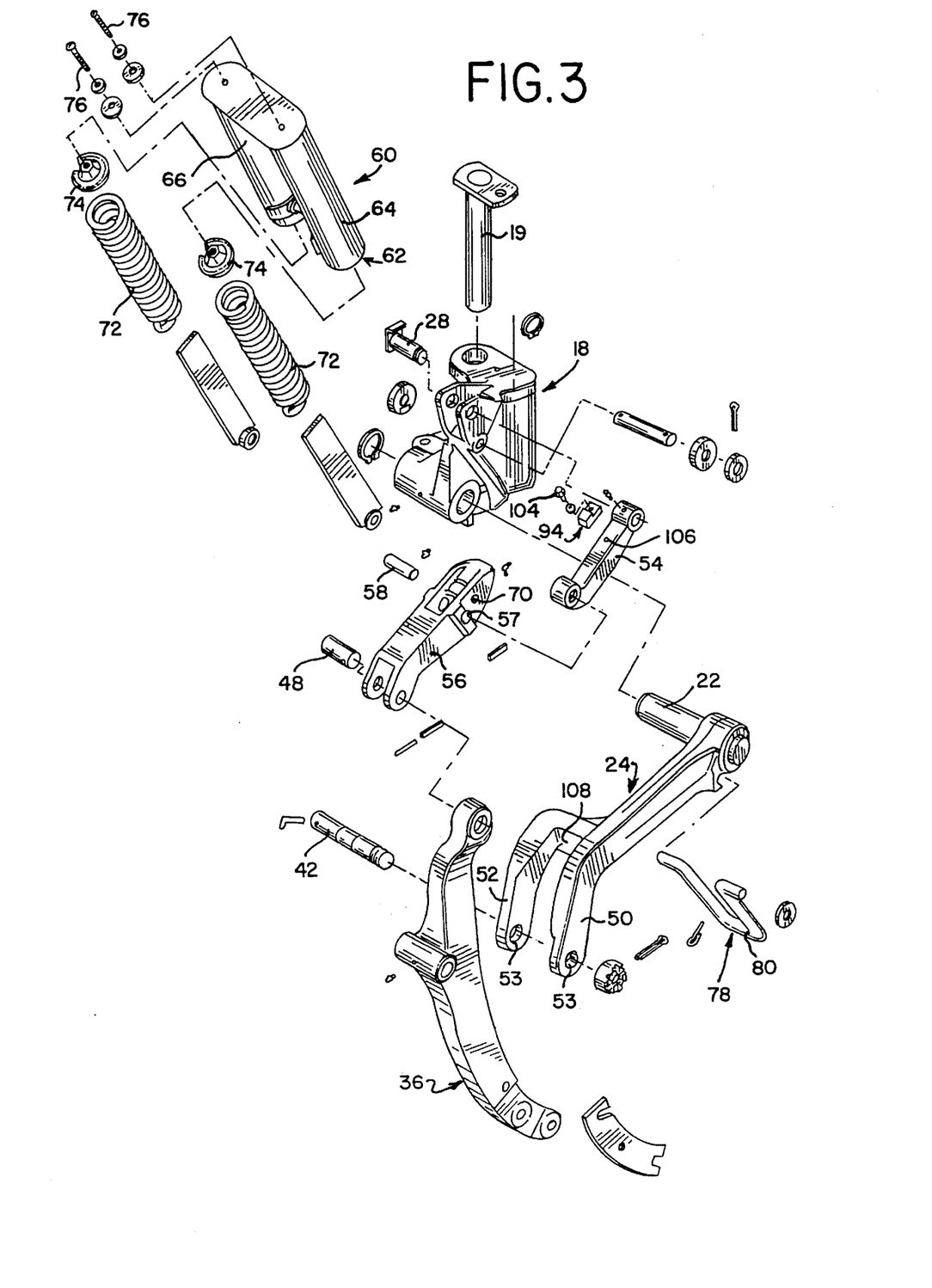
FIG. 3 is an exploded perspective view of the linkage assembly of the present invention.

The fulcrum 57 of the upper link 34 is biased toward, but is maintained short of, an on-center relation with respect to the axes of pivot pin 28 and pin 48 by a spring assembly 60. As shown in FIGS. 2 and 3, the spring assembly 60 includes a spring housing 62 comprising two spring canisters 64 and 66 which are integrally joined to each other at an upper end and extend downwardly on opposite lateral sides of the upper link 34. In the illustrated embodiment, the lower ends of the canisters 64, 66 are pivotally connected to a forward end of toggle 52 as at 70.

An extension spring 72 is fitted within and extends upwardly from the open bottom end of each canister 64, 66. As shown in FIG. 3, a cap or adjuster 74 sits atop the free upper end of each spring 72 within each canister 64, 66. A threaded bolt 76 passes through the closed upper end of each canister 64, 66 and threadably engages with the cap 74 associated with the respective spring 72. A generally "U" shaped spring holder 78 is connected to the lower end of each spring 72 contained in canisters 64, 66. As is shown, a lower bight portion 80 of the spring holder 78 engages an underside of link 24.

Figure 4:
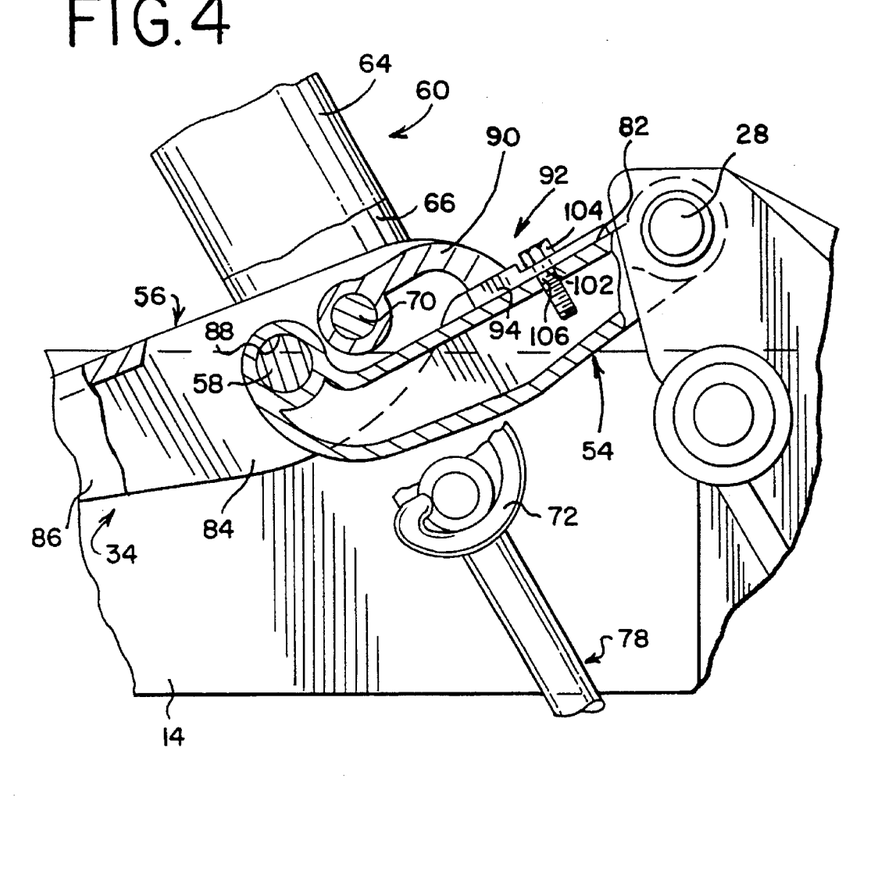
FIG. 4 is a fragmentary sectional view taken along line 4—4 of FIG. 2.

During a plowing operation, the spring assembly 60 normally holds the toggle members 54, 56 in non-collapsible relation (as shown in FIG. 1 ) relative to each other. As shown in FIG. 4, a rear end of the front member 54 of the upper link 34 is configured to journal the pivot pin 58. In the illustrated embodiment, the toggle member 54 is provided with an upper surface 82 having a generally planar configuration that extends forwardly from the pivot pin 58.

As shown in FIG. 4, at least the forward end of toggle member 56 is provided with a pair of laterally spaced parallel arms 84, 86 which extend on opposite rear sides of toggle member 54 and forwardly of the fulcrum pin 58. The arms 84, 86 of member 56 each define axially aligned apertures 88 for receiving and holding opposite ends of pivot pin 58. A transverse member 90 is provided at the; forward end of member 56 above the upper surface 82 of toggle member 54. As mentioned above, the canisters 64, 66 of spring assembly 60 are connected to the forward portion of toggle member 56 as at 70. The spring 72 in the canisters 64, 66 tend to urge member 90 downwardly and into engagement with the upper surface 82 of toggle member 54 thereby applying a downward force on the tool 16.

Figure 5:
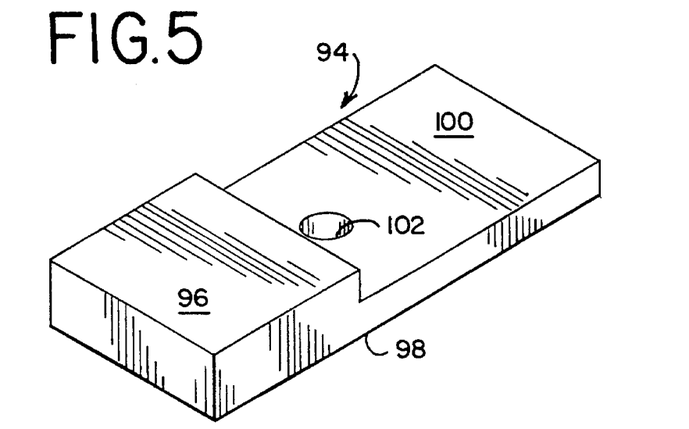
FIG. 5 is a perspective view of part of an adjusting mechanism forming pan of the present invention.

The plow implement further includes an adjustment mechanism 92 for regulating the range of draft conditions required to move the toggle members 54, 56 of upper link 34 to a collapsed position relative to each other. The adjustment mechanism 92 preferably comprises an adjustable member 94 having a vertically stepped configuration. As shown in FIG. 5, one end of member 94 is provided with a generally planar top surface 96 disposed a first predetermined vertical distance from a continuous and generally flat planar bottom surface 98 of member 94. The opposite end of the adjustable member 94 is provided with a generally planar top surface 100 disposed a second predetermined vertical distance from the bottom surface 98 of member 94. In the illustrated embodiment, an aperture 102 is provided intermediate the ends of member 94.

As shown in FIG. 4, a suitable fastener 104, such as a bolt or the like, passes through the aperture 102 and threadably engages with a threaded aperture 106 defined in the toggle member 54 to releasably secure the bottom surface 98 of adjustment member 94 to the upper surface 82 of toggle member 54. The aperture 102 in member 94 and the aperture 106 in toggle member 54 are arranged such that when the adjustment member 94 is secured to toggle member 54, either planar surface 96 or planer surface 100 underlies and engages with the transverse member 90 on toggle member 54.

The plow unit or tool 10 is limited in a downward direction by the standard 36 engaging with the lower link 24. As mentioned above, standard 36 is secured between the bifurcated arms 50 and 52 of link 24. As shown in FIG. 3, a generally vertical surface 108 is defined by link 24 between the arms 50 and 52. As will be appreciated from FIG. 1, the engagement of the forward surface 110 of standard 36 against surface 108 limits the downward movement of the tool 16.

The suspension of the ground engaging tool 16 from the frame 12, as by virtue of standard 36 and the generally parallel links 24 and 34, allows the tool 16 to vertically move or "float" without breaking the upper toggle link 34. Instead, the links 24 and 34 pivot about pins 22 and 28, respectively, thus allowing generally straight vertical movement of the tool 16. The ability of the tool 16 to vertically float avoids damage to the tool 16 from draft conditions directing a force vertically upward against the bottom of the tool 16. As will be appreciated, however, a predetermined level of downward pressure must be maintained on the tool 16 to allow it to penetrate the ground as the implement is drawn across the field by a tractor or the like.

Figure 6:
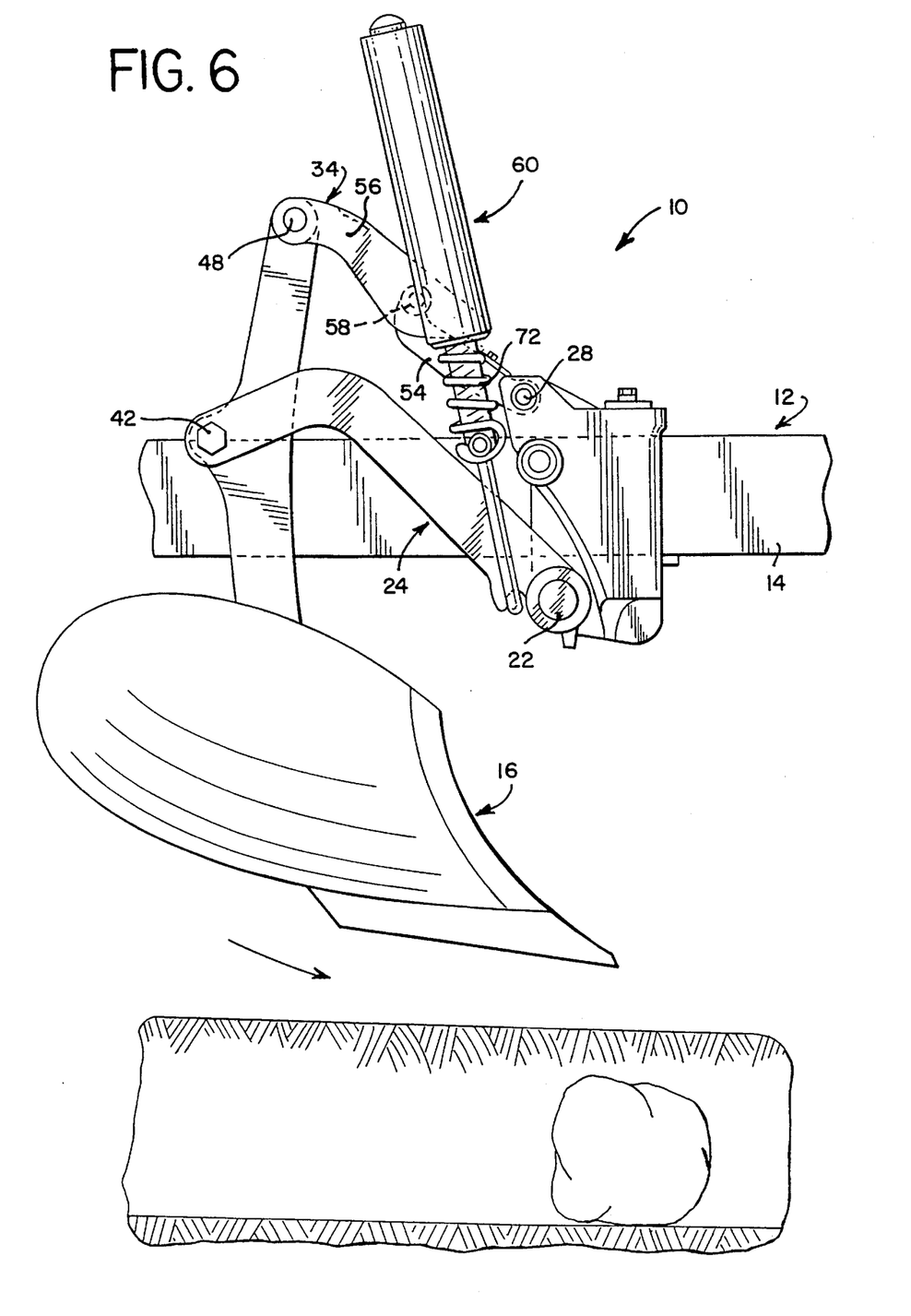
FIG. 6 is a view similar to FIG. 1 showing the plow unit in a fully tripped position.

When the tool 16 engages an obstruction such as a rock or root buried beneath an upper surface of the ground, or when the draft conditions or forces directed rearwardly against the tool exceed a predetermined range, the tool 16 moves upwardly and rearwardly from the position shown in FIG. 1 to a tripped position in FIG. 6. When the draft conditions applied against the plow unit 16 exceeds the predetermined range, the pivot pin 58 moves away from its generally on-center relationship relative to the axes of pivot pins 28 and 48 and against the action of springs 72 of spring assembly 60. As is well-known, the tool 16 only momentarily remains in a tripped position, since the weight of the tool 16 and the action of the spring assembly 60 combine to urge pin 58 toward its generally on-center relationship relative to the axes of pivot pins 28 and 48 and return the toggle members 50, 52 of upper link 34 to their non-collapsed position relative to each other.

When the plow unit 16 approaches the surface of the ground at a favorable angle with respect thereto, the point of the plow is pulled downwardly by its forward progress until it reaches its predetermined level of operation. The rocking of the standard 36 and plow unit 16 about the axis of pivot pin 42 at the beginning of the return cycle, therefore, disposes the plow unit 16 at a favorable angle with respect to the ground, so that at the completion of the return cycle the plow unit 16 at a relatively shallow angle relative to the ground and is positioned to enter the ground and automatically return to its operating depth without interrupting the forward motion of the implement.

With the present invention, the pivot pins 22, 28, 42 and 48 are geometrically positioned relative to each other to enhance the performance of the ground engaging tool 16 while only slightly increasing the preload spring tension of springs 72 of the spring assembly 60. Table I compares two different rated springs and the range or level of draft force required to "float" and "trip" the tool 16 on a device as shown in U.S. Pat. No. 3,321,027 to Johnson et al.

TABLE I

|  | PRELOADED SPRING TENSION SETTING | 1479 LB. | 1600 LB. |
|---|---|---|---|
| FLOAT LOAD | NORMAL SETTING | 3200 LB. | 3400 LB. |
|  | MAXIMUM SETTING | 3100 LB. | 3300 LB. |
| TRIP LOAD | NOMINAL SETTING | 3600 LB. | 3900 LB. |
|  | MAXIMUM SETTING | 6000 LB. | 6500 LB. |

Table II below compares the same two springs used in combination with the improved linkage assembly 17 of the present invention. A comparison of Tables I and II reveals a completely different range or level of draft forces required to "float" or "trip" the tool 16 on an implement according to the present invention as compared to the Johnson et al. device.

TABLE II

|  | PRELOADED SPRING TENSION SETTING | 1479 LB. | 1600 LB. |
|---|---|---|---|
| FLOAT LOAD | NORMAL SETTING | 4300 LB. | 4600 LB. |
|  | MAXIMUM SETTING | 4300 LB. | 4600 LB. |
| TRIP LOAD | NOMINAL SETTING | 3800 LB. | 4200 LB. |
|  | MAXIMUM SETTING | 6300 LB. | 6800 LB. |

As will be appreciated from a comparison of Tables I and II, the "trip" loads between the two designs does not substantially vary between the two designs. This is a beneficial result, however, since it would not be desirous to significantly increase the level of force required to elevate or remove the tool 16 when it engages an obstruction. Thus, with the present invention, the range of conditions required to forcibly remove the tool 16 to a tripped position does not substantially differ from that of the Johnson et al. design thereby preserving the useful life of the tool. On the other hand, the design changes embodied with the present invention significantly changes and advantageously alters the performance of the implement regarding the range of conditions encountered before the tool begins to "float".

Figure 7:
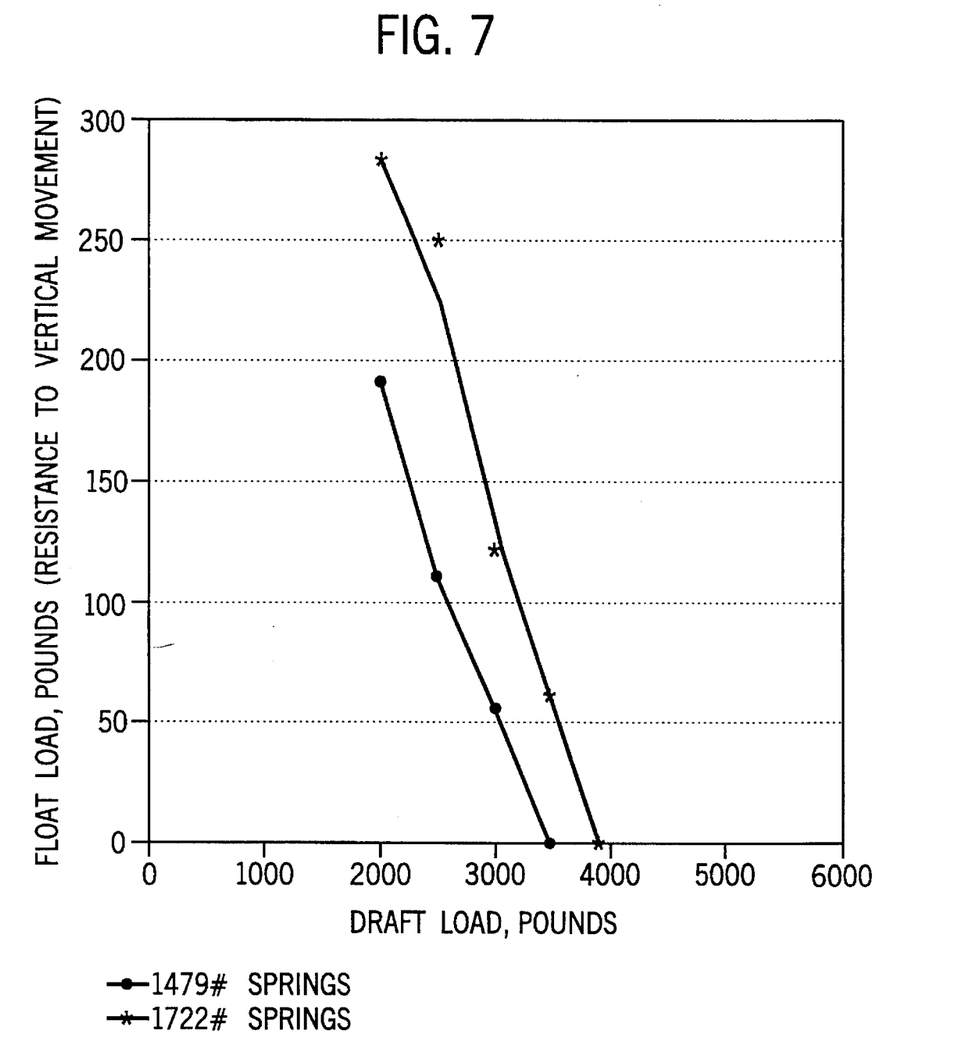
FIG. 7 is a graphical representation of the resistance to vertical movement applied to a tool using a prior art design using two different spring tension settings.
Figure 8:
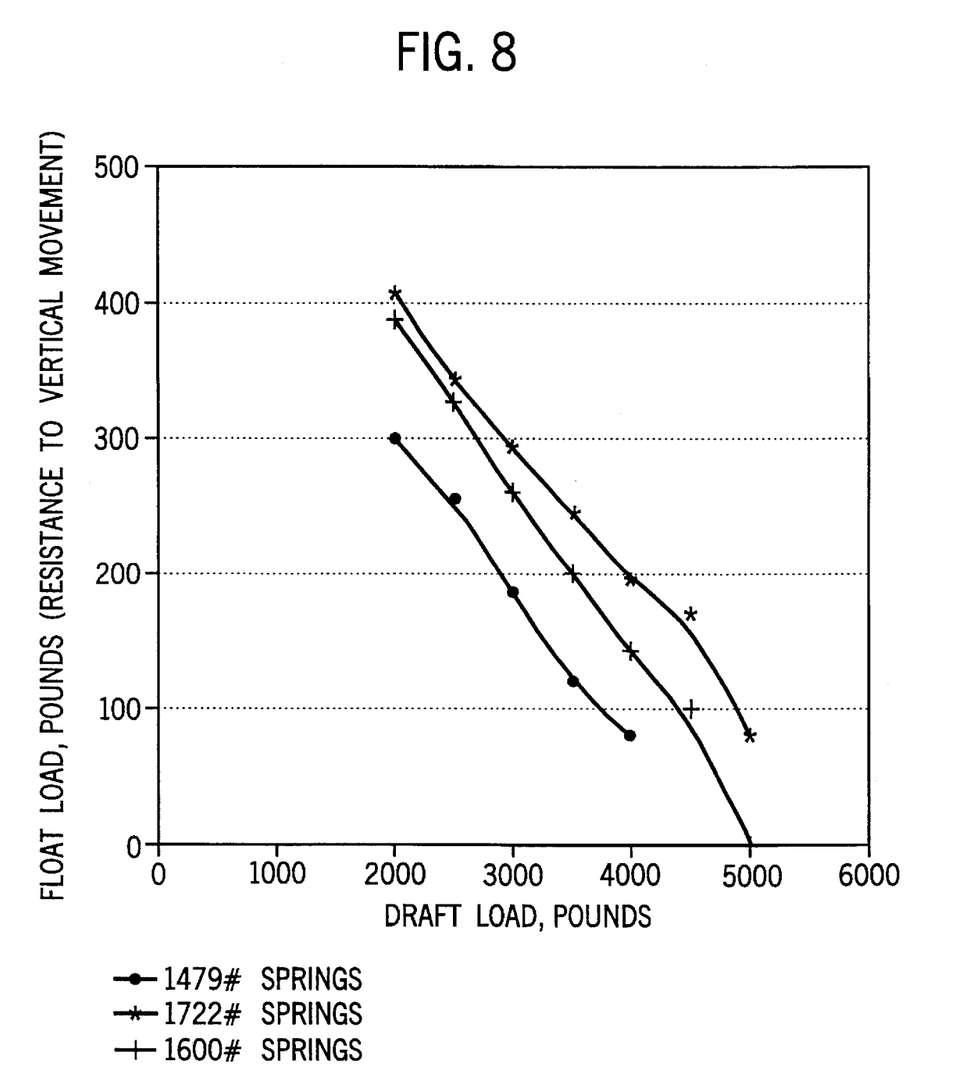
FIG. 8 is a graphical representation of the resistance to vertical movement applied to a tool with the design of the present invention using three different spring tension settings.

A comparison of FIGS. 7 and 8 reveals further distinct advantages to be gained with the present invention. Table III graphically represents the resistance to vertical movement applied to tool 16 under varying draft conditions with the Johnson et al. device. When a spring having a 1479 pound preload spring tension setting is used in combination with the Johnson et al. design, the tool 16 has about a 60 pound resistance to vertical movement when a 3000 pound draft condition is applied to the tool 16. As illustrated in FIG. 7, when a far more expensive spring having a 1722 pound preload spring tension setting is used in combination with the Johnson et al. device, tool 16 has substantially no resistance to vertical movement when a draft condition exceeding about 3900 pounds is applied to the tool 16.

In contrast, the design of the present invention provides a greater resistance to vertical movement of the tool 16 over a far greater range of draft conditions than does the prior art. As shown in FIG. 8, with the present invention and using springs 72 having a 1600 pound preload spring tension setting, the tool 16 is provided with about a 200 pound resistance to vertical movement even when the draft conditions applied to the tool equal 4000 pounds and with the tool or plow unit in an operational position, the design of the present invention, the tool 16 is provided with varying degrees of resistance to vertical movement until the draft conditions exceed almost 5000 pounds.

A comparison of the schematic representations in FIGS. 7 and 8 reveal how the design of the present invention provides an enhanced resistance to vertical movement even in those situations where a 1479 preloaded spring tension setting anti 1722 preloaded spring tension setting are used in combination with the present invention.

During the normal plowing operation, the mold board plow unit 16 seeks its own depth or operational position in the ground depending upon the line of draft from the off-highway implement pulling the implement through the ground. When the tool 16 is in its operational position in the ground, pivot pin 22 is below and forward of pivot pin 28 while being forward and above pin 42 but beneath pin 48. Moreover, when the tool 16 is in its operational position in the ground, pivot pin 42 is beneath and rearward of pivot pin 48 which is rearward and beneath pin 28 but vertically above pin 22. In a most preferred form of the invention, the pivot connections defined by pins 22 and 42 are separated by a fore- and aft-distance which is 133% greater than a fore- and-aft distance separating the pivot connections defined by pins 28 and 48, respectively. Moreover, the pivot connections defined by pivot pins 42 and 48 are separated by a vertical distance which is 112% greater than the vertical distance separating the pivot connections defined by pins 22 and 28, respectively. Notably, and with the tool or plow unit in an operational position, an included angle of less than 130# is formed between an on-center line passing through the second and fourth connections 42 and 46, respectively, and an on-center line passing through the third and fourth connections 26 and 46, respectively, of the linkage assembly 17.

Providing adjusting mechanism 92 allows the trip load for the tool 16 to be adjusted to different settings. First, when the top surface 96 of adjustable member 94 is disposed beneath the transverse member 90 on the toggle member 56, file pivot connection or fulcrum 57 of the upper link 34 is set the furthest distance from an on-center relation with respect to the axes of pivot pin 28 and pin 48. Accordingly, it will be easier to "break" the upper link 34. When top surface 100 of adjustable member 94 is disposed beneath the transverse member 90 on the toggle member 56, the pivot connection or fulcrum 57 of the upper link 34 is set closer to an on-center relation with respect to the axis of pivot pin 28 and 48 thus increasing the draft condition required to be applied against the tool 16 in order to "break" the upper link. Alternatively, the fastener 104 can be removed thereby allowing the adjustable member 94 to be removed completely from beneath the transverse member 90 of the toggle member 56. As will be appreciated, when the adjustable member 94 is removed, the transverse member 90 on toggle member 56 is urged into contact with the upper surface 82 on the toggle member 54. Thus, the pivot connection or fulcrum 57 on the upper link 34 is set closest to the on-center relation with respect to the axis of pivot pin 28 and pin 48. As will be appreciated, the closer the fulcrum 57 is set to the on-center relation with respect to the axis of pivot pin 28 and pin 48, the higher the draft condition or force required to be applied against the tool 16 to force the toggle members 54 and 56 into a collapsed relation relative to each other.

The linkage of the present invention allows the float loads of the implement to be substantially increased (from about 3100 to about 4600 pounds) while incurring only a minor increase in the trip load for the tool 16. Thus, the tool 16 can be drawn through the field with higher draft conditions being applied thereto while maintaining proper operation of the tool. The advantage of being able to incur a higher draft conditions without adversely affecting performance of the tool 16 is apparent to those skilled in the art. While significantly increasing the "float" load, the design of the present invention minimally effects the level of draft conditions required to "trip" the tool. Notably, the ability of the implement to be removed to a tripped position protects the tool against damage when subterranean rocks or roots are incurred by the tool. Moreover, increasing the spring pressure from 1479 pounds to 1600 pounds improves the reset action of the tool by lifting greater loads (plow units), and causing a faster reset action.

From the foregoing, it will be observed that numerous modifications and variations can be effected without departing from the true spirit and scope of the novel concept of the present invention. It will be appreciated that the present disclosure is intended as an exemplification: of the invention, and is not intended to limit the invention to the specific embodiment illustrated. The disclosure is intended to cover by the appended claims all such modifications as fall within the scope of the claims.

What is claimed is:

1. In a plowing implement having an elongated beam, a plow unit configured to seek a predetermined operational ground engaging position as it is pulled through the ground, and a linkage assembly for connecting the plow unit to the beam to allow for vertical floating movement of the plow unit in a generally upward direction from its operational ground engaging position when high draft conditions are encountered and tripping movement from a normal operating position below a surface of the ground to a tripped position above the ground when abnormally high draft conditions are encountered, said linkage assembly comprising a generally vertical standard connected to said plow unit, a support connected to said beam for movement about a generally vertical axis, a lower fixed length fore-and-aft extending link, said link being articulately connected at one end to said support and at an opposite end to said standard for movement about first and second pivot connections, respectively, an upper fore-and-aft extending link extending generally parallel to and above the lower link, said upper link being articulately connected at one end to said support and at an opposite end to said standard for movement about third and fourth pivot connections, respectively, said upper link comprising two elements joined to each other at a fifth pivot connection arranged between and above an on-center relation relative to said third and fourth pivot connections, and wherein said first pivot connection is beneath and forward of said third pivot connection while said second pivot connection is beneath and rearward of said fourth pivot connection, and a spring mechanism for normally holding the elements of said upper link in non-collapsible relation relative to each other in the operating position of the plow unit and for inhibiting said plow unit from upwardly floating until a predetermined float load has been exceeded as the plow unit is pulled through the ground, said spring mechanism fun:her permitting said elements of said upper link to move to a collapsed relation relative to each other in response to a predetermined trip loading being applied against the plow unit, said spring mechanism including springs connected to the upper link proximate to the fifth pivot connection and having about a 1600 pound preload spring tension setting thereon, said pivot connections on the linkage assembly being arranged such that said first and second pivot connections are separated by a fore-and-aft distance which is 133% greater than a fore-and-aft distance separating the third and fourth pivot connections, and wherein said second and fourth pivot connections are separated by a vertical distance which is 112% greater than the vertical distance separating the first and third pivot connections, with an included angle of greater than 128.5° being formed between an on-center line passing through the second and fourth pivot connections and an on-center line passing through the third and fourth pivot connections when said plow unit is in its operational ground engaging position such that the 1600 pound preload spring tension setting of the spring mechanism requires about a 4600 pound draft condition to be applied to the plow unit before the plow unit begins to elevationally float and a draft condition ranging between about 4200 and 6800 pounds is required to be applied to the plow unit before the spring mechanism allows the elements of the upper link to move to a collapsed position thereby removing the plow unit from the ground and to a tripped position above the ground.

2. The plowing implement according to claim 1 wherein said spring mechanism further includes a housing wherein said springs are retained and which is pivotally connected along its length to the upper link of the linkage assembly.

3. The plowing implement according to claim 1 further including a adjustment mechanism releasably connected to at least one of the elements of the upper link for regulating the level of draft force required to be applied to the plow unit to effect the collapse of the elements of the upper link.

* * * * *